United States Patent
Na et al.

(10) Patent No.: US 8,102,495 B2
(45) Date of Patent: Jan. 24, 2012

(54) DISPLAY SUBSTRATE AND DISPLAY PANEL HAVING THE SAME

(75) Inventors: Hye-Seok Na, Seoul (KR); Byoung-Sun Na, Gyeonggi-do (KR); Won-Hee Lee, Seoul (KR); Ho-Kyoon Kwon, Seoul (KR); Ji-Hyun Kwon, Chungcheongnam-do (KR)

(73) Assignee: Samsung Electronics Co., Ltd. (KR)

( * ) Notice: Subject to any disclaimer, the term of this patent is extended or adjusted under 35 U.S.C. 154(b) by 471 days.

(21) Appl. No.: 12/418,873

(22) Filed: Apr. 6, 2009

(65) Prior Publication Data

US 2009/0290114 A1   Nov. 26, 2009

(30) Foreign Application Priority Data

May 22, 2008   (KR) .................................. 2008-47417

(51) Int. Cl.
  *G02F 1/1343* (2006.01)
(52) U.S. Cl. ........................ 349/139; 349/142
(58) Field of Classification Search .............. 349/65–69, 349/131–139, 106, 141–142
  See application file for complete search history.

(56) References Cited

U.S. PATENT DOCUMENTS

| | | | |
|---|---|---|---|
| 7,352,425 B2 * | 4/2008 | Ono et al. | 349/141 |
| 7,787,092 B2 * | 8/2010 | Mizusako et al. | 349/142 |
| 2004/0169777 A1 * | 9/2004 | Tanaka et al. | 349/39 |
| 2006/0012741 A1 * | 1/2006 | Mizusako | 349/130 |
| 2006/0044501 A1 * | 3/2006 | Mizusako | 349/123 |
| 2007/0040974 A1 * | 2/2007 | Ninomiya et al. | 349/129 |
| 2007/0216850 A1 * | 9/2007 | Tsuji et al. | 349/158 |

FOREIGN PATENT DOCUMENTS

| | | |
|---|---|---|
| JP | 2007-249202 | 9/2007 |
| KR | 1020060018399 | 3/2006 |
| KR | 1020070025458 | 3/2007 |

OTHER PUBLICATIONS

English Abstract for KR Pat. Pub. No. 1020070025458, 1 page.
English Abstract for KR Pat. Pub. No. 1020060018399, 1 page.
English Abstract for JP Pat. Pub. No. 2007-249202, 1 page.

* cited by examiner

*Primary Examiner* — Akm Ullah
(74) *Attorney, Agent, or Firm* — Innovation Counsel LLP (57) ABSTRACT

A first slit pattern is formed in a display substrate and a display panel of vertical alignment mode having the display substrate. The first slit pattern includes slits, a pair of projections and a pair of notches. A divergence point where the slits meet each other and an incision portion of the slits have the same function as the pair of projections in the generation of a singular point of liquid crystal. A contact hole exposing a part of an output electrode of a switching element is formed at a protective layer of an array substrate. A step recess is formed at a protective layer corresponding to a storage electrode, a divergence point of the slits is arranged to correspond to the storage electrode. The singular point of the liquid crystal is induced to occur at a regular position, and thus afterimages and spots can be prevented.

20 Claims, 9 Drawing Sheets

DISPLAY SUBSTRATE AND DISPLAY PANEL HAVING THE SAME

CROSS REFERENCE TO RELATED APPLICATIONS

This application claims priority under 35 U.S.C. §119 to Korean patent Application No. 2008-47417, filed on May 22, 2008 in the Korean Intellectual Property Office (KIPO), the contents of which are herein incorporated by reference in their entirety.

BACKGROUND OF THE INVENTION

1. Field of the Invention

The present invention relates to a substrate for a display and a display panel based on the substrate. More particularly, the present invention relates to a substrate for a display used as an upper substrate in a vertical alignment liquid crystal display (LCD) device, and a display panel including the substrate.

2. Description of the Related Art

Generally, liquid crystal display (LCD) devices are the most widely used type of flat panel display device. An LCD device includes electric field-generating electrodes formed on two substrates, and a liquid crystal layer interposed between the two substrates. A voltage is applied to the electrodes to rearrange the liquid crystal molecules in the liquid crystal layer, to thereby control the transmissivity of light through the liquid crystal layer.

The most widely used LCD devices are those having two substrates on which electric field-generating electrodes are formed. An LCD device, in general, includes pixel electrodes formed on a first substrate and a common electrode covering an entire surface of a second substrate. An image is displayed by applying a suitable voltage to each pixel electrode. A thin-film transistor (TFT) is connected to each pixel electrode for switching the voltage applied to the pixel electrode. A signal for controlling a TFT is transmitted on each gate line, and a voltage is transmitted to a pixel electrode on each data line. The gate lines and the data lines are formed on the substrates However, one disadvantage of an LCD device is its narrow viewing angle. As a result, various techniques have been developed to widen the viewing angle. Among these techniques is a method for dividing a pixel into a multi-domain structure which includes vertically aligning the liquid crystal molecules with respect to the first and second substrates, and forming a slit pattern (also known as a protrusion pattern) on the pixel electrode and the common electrode.

Problems frequently occur where after images and spots are generated in the slit pattern, or where spots remain after rubbing a screen.

SUMMARY ON THE INVENTION

According to one embodiment of the present invention, a substrate for a display includes a base substrate having a pixel region that is defined along a horizontal direction and a vertical direction. The substrate for the display also includes a transparent electrode on the base substrate. The transparent electrode includes a slit pattern having slits in the pixel region. Alternately aligned along the slits are pairs of projections, and pairs of notches. The notches may be placed substantially adjacent to a divergence point where adjacent slits meet each other, and the pair of the projections may be placed substantially adjacent to a edge of the pixel region.

According to another embodiment of the present invention, a first display panel includes a first substrate, a second substrate, and a liquid crystal layer between the first substrate and the second substrate. The first substrate includes a common electrode and an upper substrate on which a pixel region extending a horizontal direction and a vertical direction is defined. The common electrode includes a first slit pattern having slits in the pixel region, a pair of projections, and a pair of notches, where the pair of the projections and the pair of the notches are alternately arranged along the slits. The notches are substantially adjacent to a divergence point where adjacent slits meet each other, and the pair of projections is substantially adjacent to an edge of one of the slits on the vertical side. The second substrate includes: a lower substrate; a switching element formed on the lower substrate; a protective layer having a contact hole exposing a portion of an output electrode of the switching element and corresponding to the pair of projections; and a pixel electrode with a second slit pattern arranged in a staggered pattern with the first slit pattern. The pixel electrode is on the protective layer and is connected to the output electrode through the contact hole.

According to yet other embodiments of the present invention, a second display panel includes a first substrate, a second substrate, and a liquid crystal layer between the first substrate and the second substrate. The first substrate includes: an upper substrate having a pixel region having a horizontal direction and a vertical direction; a plurality of protrusions formed on the upper substrate in the pixel regions, respectively; and a common electrode that includes a first protrusion pattern having a pair of projections and a pair of notches on the protrusions. The pair of projections and the pair of notches are alternately arranged along the protrusions, with the notches being substantially adjacent to a divergence point where adjacent protrusions meet each other, and the pair of the projections being substantially adjacent to an incision portion of the protrusion arranged in the vertical side. The second substrate includes: a lower substrate; a switching element formed on the lower substrate; a protective layer having a contact hole exposing a portion of an output electrode of the switching element and corresponding to the pair of the projections; and a pixel electrode. At the pixel electrode, a second protrusion pattern has a staggered pattern with the first protrusion pattern. The pixel electrode is formed on the protective layer and is connected to the output electrode through the contact hole.

According to the display substrate and the display panel of the present invention, the generation of afterimages may be prevented by controlling the position where a singular point of liquid crystal is generated. Therefore, the display quality of the display panel may be enhanced.

BRIEF DESCRIPTION OF THE DRAWINGS

The present invention is better understood upon consideration of detailed example embodiments, with reference to the accompanying drawings.

DETAILED DESCRIPTION OF THE INVENTION

The present invention is described more fully hereinafter with reference to the accompanying drawings, in which example embodiments of the present invention are shown. The present invention may, however, be embodied in many different forms and should not be construed as being limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, quantities, steps, operations, elements, and/or components, but do not preclude the presence or addition of one or more other features, quantities, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
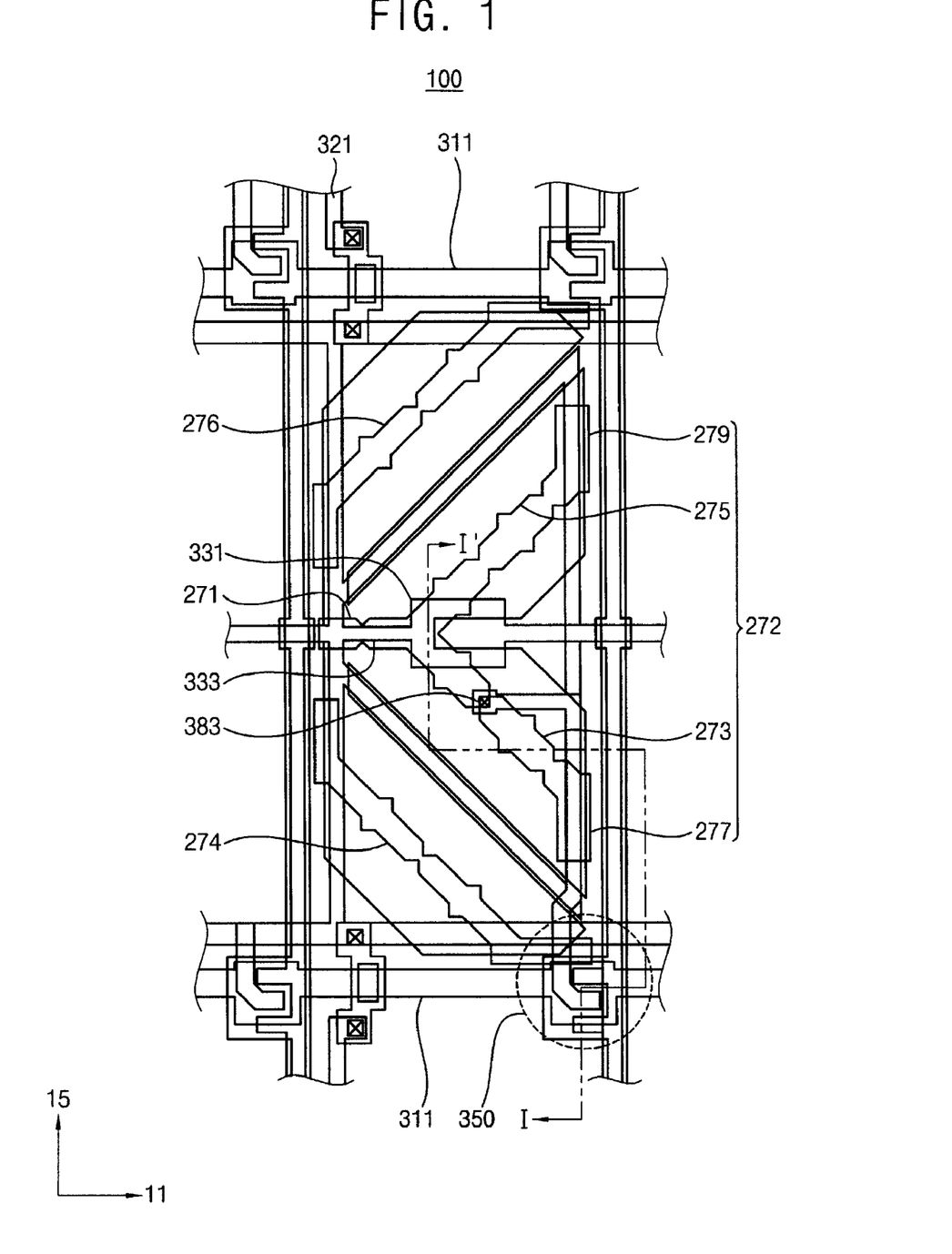
FIG. 1 is a plan view illustrating a display panel in accordance with a first embodiment of the present invention.
Figure 2:
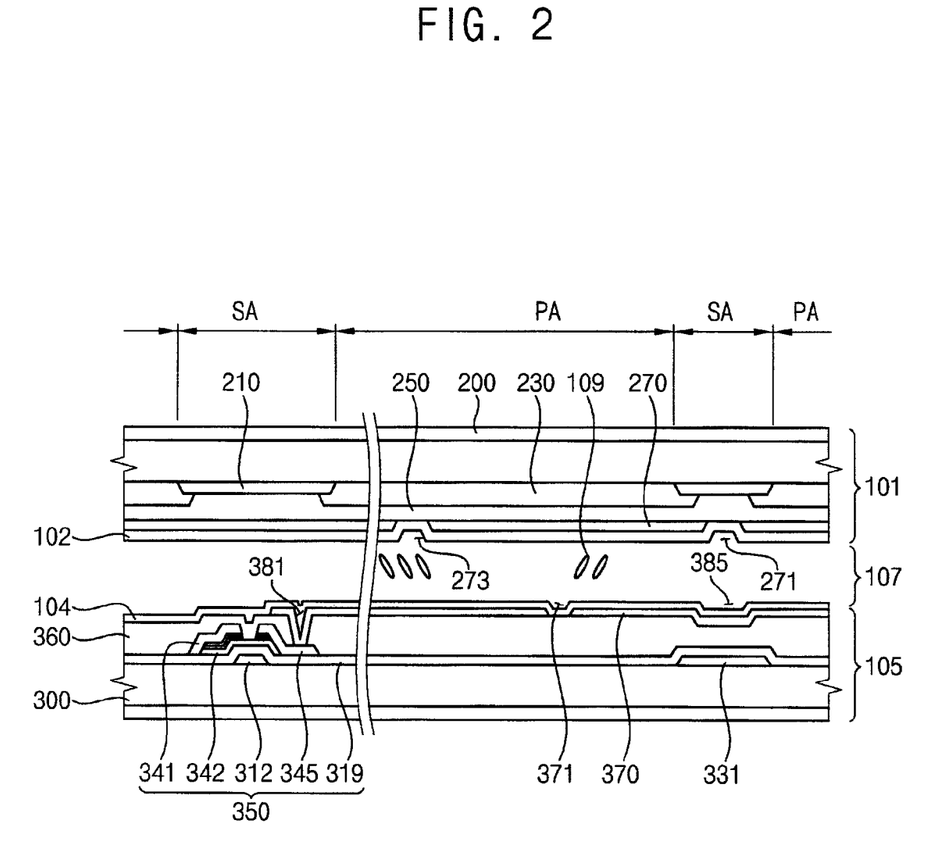
FIG. 2 is a cross-sectional view illustrating the display panel taken along line I-I' in FIG. 1.

FIG. 1 is a plan view illustrating a display panel in accordance with one example embodiment of the present invention, and FIG. 2 is a cross-sectional view illustrating the display panel taken along a line I-I' in FIG. 1.

Referring to FIGS. 1 and 2, a display panel 100 includes a first substrate 101, a second substrate 105 and a liquid crystal layer 107.

The first substrate 101 and the second substrate 105 are positioned to face each other, on opposite sides of the liquid crystal layer 107. Liquid crystal molecules 109 in the liquid crystal layer 107 may be aligned in a direction substantially perpendicular to the first substrate 101 and the second substrate 105. The liquid crystal molecules 109 may be arranged between an upper alignment layer 102 and a lower alignment layer An upper polarizing plate (not illustrated) and a lower polarizing plate (not illustrated) may be attached to outer sides of the first substrate 101 and the second substrate 105, respectively.

In example embodiments, a display substrate may correspond to the first substrate 101. The first substrate 101 includes an upper substrate 200, a light-blocking pattern 210 formed on the upper substrate 200, a color filter pattern 230, an overcoating layer 250 and a common electrode 270. The first substrate 101 may be referred to as a color filter substrate 101.

The upper substrate 200 has a pixel region (PA) for transmitting light, and an opaque region (SA) enclosing the pixel region (PA) to block the light. The pixel region (PA) has a horizontal side and a vertical side. The pixel region (PA) is substantially rectangular.

The color filter pattern 230 is disposed in the pixel region (PA). The color filter pattern 230 includes red, green and blue filters. Substantially identical color filters may be positioned in a plurality of pixel regions (PA) aligned along a horizontal direction, whereas different color filters may be positioned in a plurality of pixel regions (PA) aligned along a vertical direction.

The light-blocking pattern 210 is disposed in the opaque region (SA) to enclose the red, green and blue filters.

The overcoating layer 250 covers the light-blocking pattern 210 and the color filter pattern 230.

Figure 3:
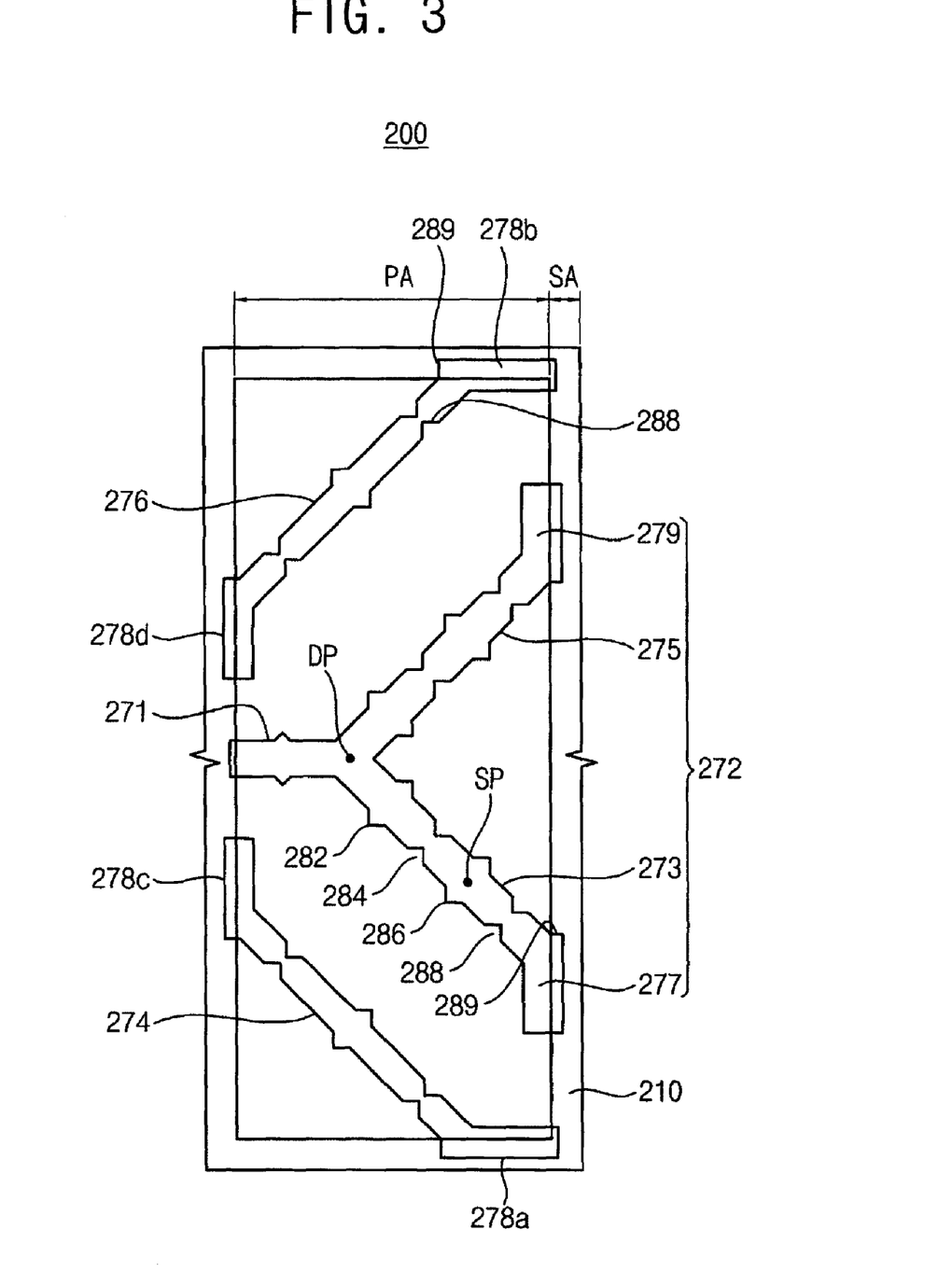
FIG. 3 is a plan view illustrating the first substrate in FIG. 1.

FIG. 3 is a plan view illustrating the first substrate 101 in FIG. 1.

Referring to FIGS. 1, 2, and 3, the common electrode 270 is disposed on the overcoating layer 250. A first slit pattern 272 is formed in the common electrode 270. The first slit pattern 272 may correspond to an opening formed through the common electrode 270. The first slit pattern 272 may include a plurality of slits, a pair of projections and a pair of notches.

In example embodiments, the slits may divide the pixel region (PA) into a plurality of domains. The pair of projections and the pair of notches may prevent spots of a singular point SP from being generated in the liquid crystal layer 107 aligned in the plurality of domains.

The singular point SP may be defined as a specific point that has no specific direction because an alignment of liquid crystals may be abruptly changed relative to the directions of peripheral liquid crystal molecules 109. The singular point SP may be generated at a position at which an electric field is substantially stronger or weaker than that at its circumference. A positive singular point may be generated at a position having an electric field substantially larger than a peripheral electric field. Additionally, a negative singular point may be generated at a position having an electric field substantially smaller than a peripheral electric field. The directions of the liquid crystals may be converged at the positive singular point, whereas the directions of the liquid crystals may be spread at the negative singular point. The positive singular point and the negative singular point may be alternately generated.

In conventional LCDs, the liquid crystals may lose an optical shutter function at the singular point SP, and afterimages or spots may be irregularly displayed on the display panel 100 at a position of the singular point SP. In a display device of the present invention, the position of the singular point SP is controlled to be constant, so that generation of the afterimages and the spots may be prevented.

Triangular protrusions opposite to each other may be formed on edges of the common electrode 270, which are defined by the slits and are opposite to each other, and the triangular protrusions are defined as the pair of projections. Recesses opposite to each other may be formed on the edges opposite to each other, and the recesses opposed to each other are defined as the pair of notches.

The negative singular point may be generated at the pair of projections having an electric field substantially smaller than a peripheral electric field. A positive singular point may be generated at the pair of notches having an electric field substantially larger than a peripheral electric field. Because a position at which the singular point SP of the liquid crystals is generated is uniform and constant and a difference between the pixel regions (PA) is not perceived, the afterimages and spots are not generated.

The slits are formed on the common electrode 270 corresponding to the each pixel region (PA). In example embodiments, the first slit pattern 272 includes a horizontal slit 271, a first slanted slit 273, a first peripheral slit 277, a second slanted slit 275 and a second peripheral slit 279.

Figure 4:
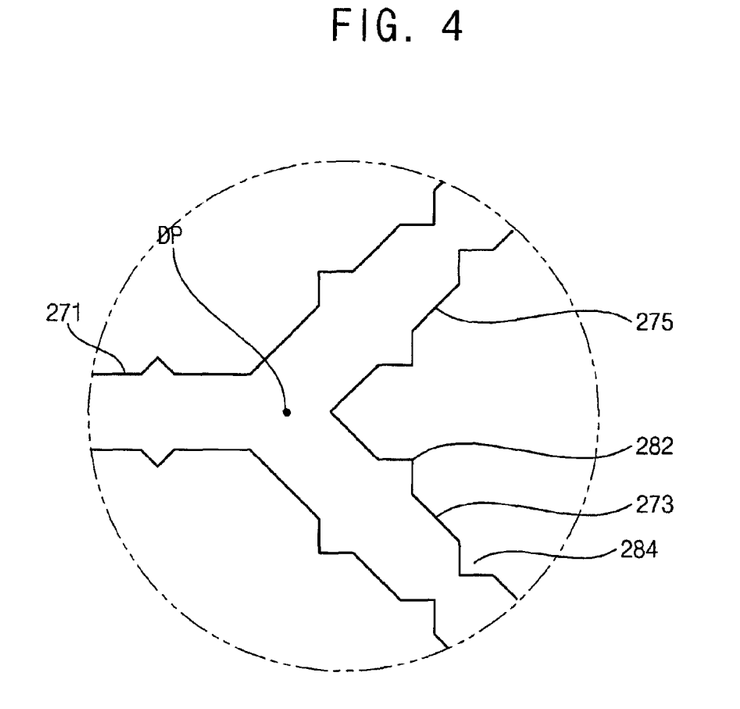
FIG. 4 is an enlarged view illustrating a first slit pattern adjacent to a divergence point where slits meet each other in FIG. 3.

FIG. 4 is an enlarged view illustrating the first slit pattern 272 located near a divergence point at which slits meet each other in FIG. 3.

Referring to FIGS. 3 and 4, the horizontal slit 271, the first slanted slit 273 and the second slanted slit 275 meet each other at a point. The point may be referred to as a divergence point (DP). The divergence point (DP) at which the slits meet each other has substantially the same function as the pair of projections in controlling the singular point SP of the liquid crystals.

The horizontal slit 271 is formed in parallel with a horizontal side of the pixel region (PA) from the divergence point (DP). The horizontal slit 271 is formed from a center of left vertical side of the pixel region (PA) to the divergence point (DP).

The first slanted slit 273 may be extended from the divergence point (DP) to a right vertical side of the pixel region (PA) in a slanted direction about 45° downward from the horizontal side of the pixel region (PA). The first peripheral slit 277 is extended from an incision portion of the first slanted slit 273 to a vertical direction of the pixel region (PA). A part of the first peripheral slit 277 may be arranged in the pixel region (PA), a remaining part may be arranged in the opaque region (SA).

The pair of projections and the pair of notches are alternately formed on the first slanted slit 273 to a direction away from the divergence point (DP). A space between the pair of projections and the pair of notches may be from about 30 μm to 45 μm. The number of the pair of projections and the pair of notches may be different from the size of the pixel region (PA).

In example embodiments, a first pair of projections 284, a second pair of notches 286 and a second pair of projections 288 may be formed in order on the first slanted slit 273 from a first pair of notches arranged near the divergence point (DP) to the slanted direction. The second pair of projections located in an outline may be spaced below 30 μm from the opaque region (PA).

The second slanted slit 275 and the second peripheral slit 279 are formed to be in mirror symmetry with respect to the first slanted slit 273 and the first peripheral slit 277 to the horizontal slit 271. Therefore, the pair of projections and the pair of notches may be alternately generated in the second slanted slit 275 corresponding to the first slanted slit 273.

The first slit pattern 272 further includes a third slanted slit 274 which is spaced from the first slanted slit 273 and is parallel with the first slanted slit 275, a fourth slanted slit 276 which is spaced from the second slanted slit 275 and is parallel with the second slanted slit 275.

The first slit pattern 272 further includes a third peripheral slit 278a which is extended to the horizontal direction 11 from one side end of the third slanted slit 274, a fourth peripheral slit 278b which is extended to the horizontal direction 11 from one side end of the third slanted slit 276.

The first slit pattern 272 further includes a fifth peripheral slit 278c which is extended to the vertical direction 15 from the other side end of the third slanted slit 274, a sixth peripheral slit 278d which is extended to the vertical direction 15 from the other side end of the third slanted slit 276.

The third slanted slit 274 and the fourth slanted slit 276 are in mirror symmetry with each other with respect to the horizontal slit 271, the pair of projections and the pair of notches may be alternately generated.

Figure 5A:
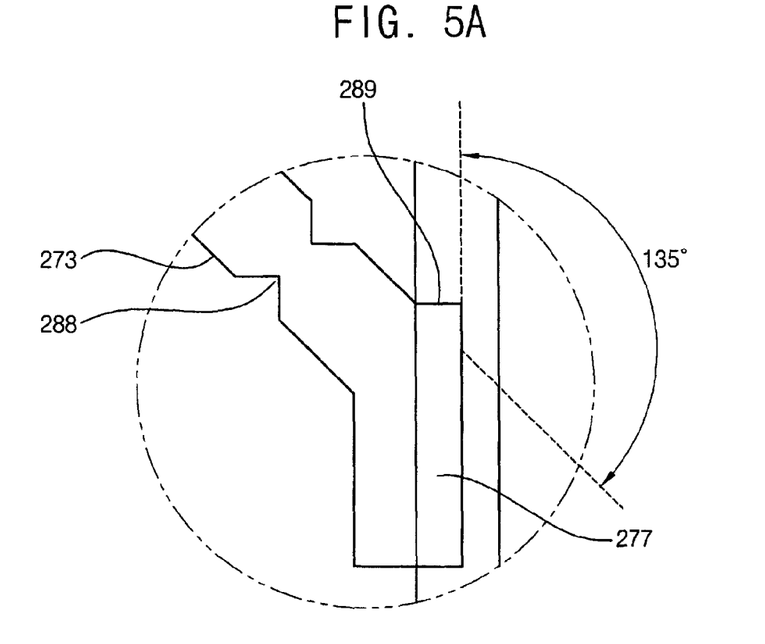
FIG. 5A is an enlarged view illustrating a first peripheral slit connected to a first slanted slit in FIG. 3.

FIG. 5A is an enlarged view illustrating the first peripheral slit 277 combining to the first slanted slit 273 in FIG. 3.

Referring to FIGS. 3 and 5A, the first peripheral slit 277 which is parallel with a right vertical side and combined to an end of the first slanted slit 273.

The negative singular point is induced at an incision portion of the first peripheral slit 277. The incision portion of the first peripheral slit 277 has substantially the same function as the pair of projections in inducing the singular point SP of the liquid crystals.

The second pair of projections 288 closest to the incision portion of the first peripheral slit 277 induces the negative singular point. Therefore, the negative singular point may be identically induced at the second pair of projections 288 and the incision portion of the first peripheral slit 277. The position of the singular point SP of the other polarity may be difficult to predict among the continuous singular point SP of the same polarity, and the position of the singular point SP of the other polarity may always be subject to change.

Thus, the pair of notches or a notch 289 which is described in FIG. 5A may be formed between the second pair of projections 288 and the incision portion of the first peripheral slit 277 to make the positive singular point induced in a regular position.

An outside edge of the first peripheral slit 277 and an outside edge of the first slanted slit 273 meets forming an obtuse angle, for example, 135°, and a corner may be formed. A pair of notches closest to the corner is the second pair of projections 288.

Referring to FIGS. 3 and 5A, the notch 289 may be further formed in the apex of the corner to alternately align the positive and the negative singular points when a distance between the apex of the corner and the second pair of projections 288 is greater than 15 μm.

The notch 289 is formed in parallel to the horizontal direction from the outside edge of the first slanted slit 273, and is connected in parallel to the outside edge of the first peripheral slit 277. Therefore, the notch 289 is L-shape.

Where a distance from the apex of the corner to the second pair of projections 288 is less than 15 μm, a notch may not be formed in the apex of the corner because narrowing a gap between the positive and the negative is adverse in controlling the singular point SP.

The second slanted slit 275 and the second peripheral slit 279 respectively have mirror symmetry to the first slanted slit 273 and the first peripheral slit 277 with respect to a horizontal line crossing the horizontal slit 271. Therefore, the first and second pair of projections and the first and second pair of notches may be formed on the second slanted slit 275, the notch 289 may be formed in the corner at which the second slanted slit 275 and the second peripheral slit 279 meet.

Likewise, referring to FIGS. 3 and 5A, the notch 289 may be formed in the corner at which the third slanted slit 274 and the third peripheral slit 278a meet, the fourth slanted slit 276 and the fourth peripheral slit 278b meet.

The first slanted slit 273 and the second slanted slit 275 may be provided perpendicular to each other. Therefore, the direction of the liquid crystal may be dispersed uniformly in four directions in the multi-domain structure.

Figure 5B:
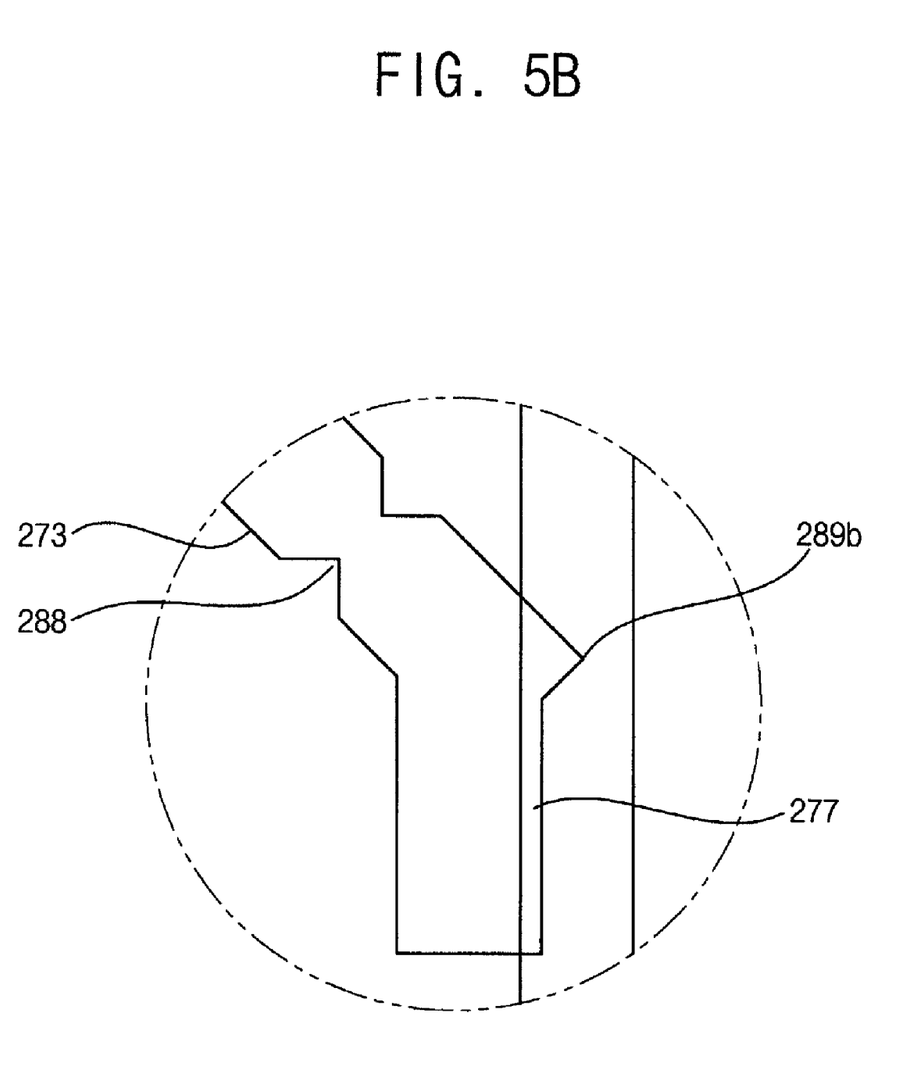
FIG. 5B is a plan view illustrating another example of a notch formed at a corner where a slanted slit and a peripheral slit meet.

FIG. 5B is a plan view illustrating another example of the notch formed in the corner at which a slanted slit and a peripheral slit meet.

The slits shown in FIG. 5B are substantially the same as the slits shown in FIG. 5A except for the shape of the notch 289b. Thus, the same reference numerals are used for the same elements, and thus descriptions for the same elements may be omitted Referring to FIGS. 5A and 5B, a notch 289b is formed in the corner at which the first and fourth slanted slits 273, 274, 275 and 276 and the first and fourth peripheral slits 277, 279, 278a and 278b meet respectively.

The notch 289b described in FIG. 5B is substantially the same as the notch 289 described in FIG. 5A except for the notch 289b has the shape of a triangle protrusion.

The notch 289b is extended parallel with the outside edge of the first slanted slit 273, and is connected making approximately 135° with the outside edge of the first peripheral slit 277. Therefore, the notch 289b has the shape of a triangle horn.

Figure 6:
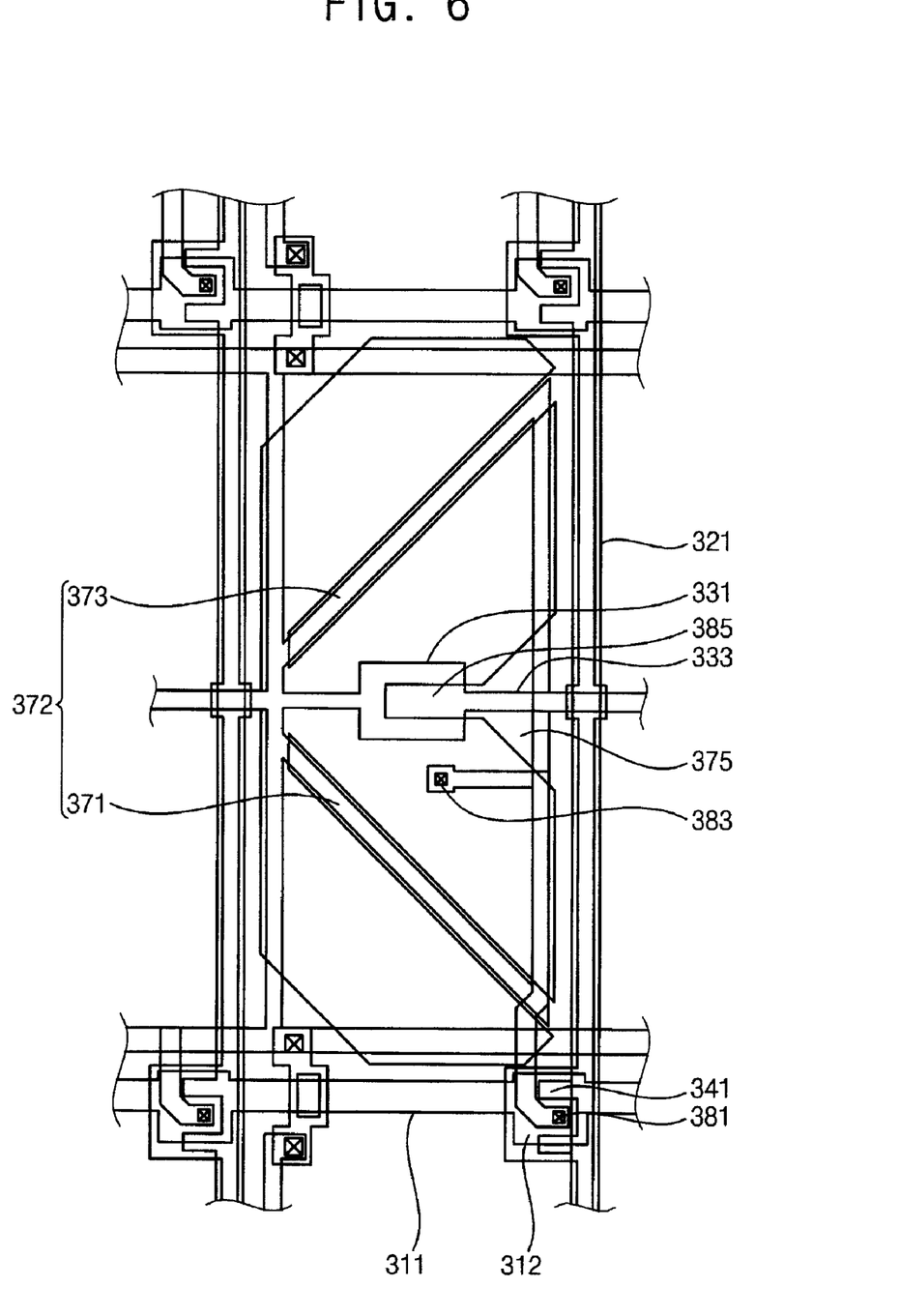
FIG. 6 is a plan view illustrating the second substrate in FIG. 1.

FIG. 6 is a plan view illustrating the second substrate 105 described in FIG. 1.

Referring to FIGS. 1, 2, 3 and 6, the second substrate 105 includes a lower substrate 300, a gate line 311 formed on the lower substrate 300, a data line 321, a storage electrode 331, a storage line 333, a switching element 350, a passivation layer 360 and pixel electrode 370. The second substrate 105 may also be referred to as an array substrate 105.

The gate line 311 transfers a gate signal to the switching element from outside. The gate line 311 formed on the lower substrate 300 aligns along a horizontal side of a pixel region PA. A part of each gate line 311 forms a plurality of gate electrode. A contact pad where the gate signal is applied may be formed in an incision portion of the gate line 311. In contrast with this, the incision portion of the gate line 311 may be directly connected to an output stage of generating circuit part arranged on the lower substrate 300.

The storage electrode 331 and the storage line 333 are formed on the lower substrate 300 in a same layer with the gate line 311. The storage electrode 331 is arranged to correspond to a divergence point DP of the slit pattern 272 in a color filter substrate 101, and is arranged among the each other adjacent gate lines 311.

The storage line 333 includes a first storage line which is extended to a horizontal direction 11 from the storage electrode 331, a second storage line which is extended from the first storage line to a vertical side of the pixel region PA. A forming method of the storage electrode 331 and the storage line 333 may be changed variously.

A gate insulate layer 319 covers the gate line 311, the storage electrode 331 and the storage line 333.

The plurality of data lines 321 aligning a vertical side is formed on the gate insulate layer 319. A drain electrode 345 is formed on a gate insulate layer 319. An incision portion of the drain electrode 345 is arranged to a vertical lower of the first pair of projections 284 which is formed at the first slanted slit 273 of the color filter substrate 101.

A source electrode 341 is protruded toward a drain electrode 345 in the data line 321. A linear semi-conductor layer 342 is aligned in a vertical direction 15 along the data line 321 below the data line 321 and the drain electrode 345. The linear semi-conductor layer 342 has a channel layer which is overlapped with a source electrode 341 and the drain electrode 345. The channel layer is corresponding to a gate electrode 312.

The switching element 350 includes the gate electrode 312, the gate insulate layer 319, the channel layer, the source electrode 341 and the semi-conductor layer 342.

The passivation layer 360 covers the switching element 350 and the data line 321. A contact hole 381 which exposes the part of the incision portion of the drain electrode 345 is formed in the passivation layer 360. Therefore, the contact hole 381 is corresponding to the first pair of projections 284 which is formed at the first slanted slit 273 of the color filter substrate 101.

A step recess which is formed in the passivation layer 360 has a function designating the negative singular point as like the pair of projections. The passivation layer 360 is sink in the contact hole 381, and the first step recess is formed.

Therefore, as the first pair of projections is arranged to correspond to the first step recess of the passivation layer 360 on the contact hole 381, the first and second pair of notches is arranged in a peripheral of the first step recess. Therefore, the first step recess designates the negative singular point, the first and second pair of notches designate the positive singular point which is peripheral of the negative singular point. Therefore, the singular point SP may be formed reliably at a regular point.

The pixel electrode 370 is formed on the passivation layer 360, and is connected to the drain electrode 345 through the contact hole 381. The second slit pattern is formed in the pixel electrode 370. The slit parts of the second slit pattern are alternately arranged with the slit parts of the first slit pattern. Therefore, the pixel region PA is divided to a plurality of domains.

The second slit pattern 372 may include a fifth slanted slit 371 and a sixth slanted slit 373.

The fifth slanted slit 371 is arranged to correspond to a space between the first slanted slit 273 and the third slanted slit 274, and is formed in parallel with the first slanted slit 273. The sixth slanted slit 373 is arranged to correspond to a space between the second slanted slit 275 and the fourth slanted slit 276, and is formed in parallel with the second slanted slit 275.

Substantially the same the pairs of projections and the pairs of notches is formed respectively in the fifth and sixth slanted slits 371 and 373 corresponding to the first and second pairs of projections 284, 288 and the first and second pairs of notches 282, 286 which are formed in the first and second slanted slits 271 and 275.

The second slit pattern 372 may further include a horizontal slit 375. The horizontal slit 375 has a scooped-out shape from a right vertical side of the pixel electrode 370 to a left vertical side of the pixel electrode 370, an entrance is extended widely in symmetry. Therefore, the pixel electrode 370 substantially has mirror symmetry with respect to the horizontal line.

The passivation layer 360 may include a passivation layer and an organic insulating layer.

The passivation layer covers the switching element 350. The organic insulating layer is formed on the passivation layer. The second step recess 385 corresponding to the storage electrode 331 may be formed in the organic insulating layer to increase a storage capacity by decreasing a distance between the storage electrode 331 and the pixel electrode 370.

The storage electrode 331 is arranged to correspond to a divergence point DP of the first slit pattern 272 of the color filter substrate 101. The second step recess 385 induces a negative singular point. The divergence point DP which has a function as the pair of projections induces the negative singular point. Therefore, the negative singular point is strengthened in the divergence point DP. The first pair of notches 282 which induces the positive singular point is arranged in the peripheral of the divergence point DP. Therefore, the positive and negative singular points are alternately formed. The singular point SP is stably formed at a regular position.

The liquid crystal layer 107 is aligned vertically between the color filter substrate 101 and the array substrate 105. The liquid crystal layer 107 includes liquid crystal LC. The liquid crystal LC changes an arrangement angle by an electric field formed between the pixel electrode 370 and the common electrode 270. The first slit pattern 272 formed in the common electrode rearranges the direction of the liquid crystal LC by distorting the direction of electric field. The second slit pattern 372 formed in the pixel electrode causes the direction of the liquid crystal LC to be rearranged by distorting the direction of electric field. Therefore, the different directions of the liquid crystal LC enhance side visibility in a plurality of domains.

The singular point of the liquid crystal in each pixel region PA is always generated at the pairs of projections and the pairs of notches, and thus a gap among the pixels may be invisible. Therefore, display quality is enhanced.

The color filter substrate 101 and the display panel 100 are applied to all type of the vertical alignment mode liquid crystal panel. The present invention is applied to all liquid crystal display (LCD) panels in which an electrode controlling the liquid crystal is patterned and the liquid crystal is aligned in a vertical direction regardless of generating method of the pixel electrode 370, position of the color filter substrate, or the organic insulating layer formed on the second substrate 105. Therefore, the illustration of the above example is omitted.

Figure 7:
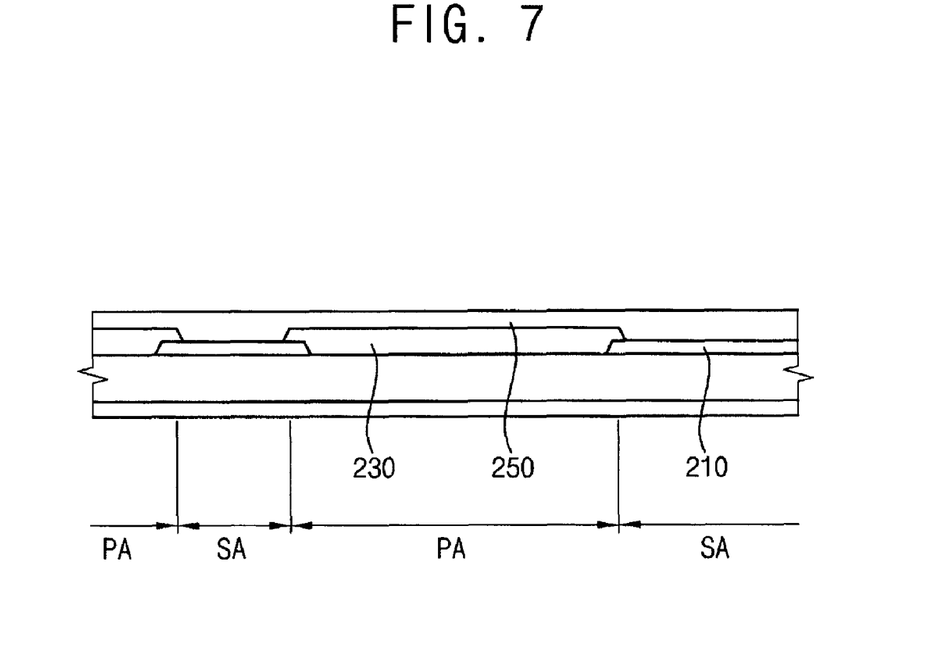
FIGS. 7 to 9 are process views illustrating a method of manufacturing the display substrate in FIG. 1.
Figure 8:
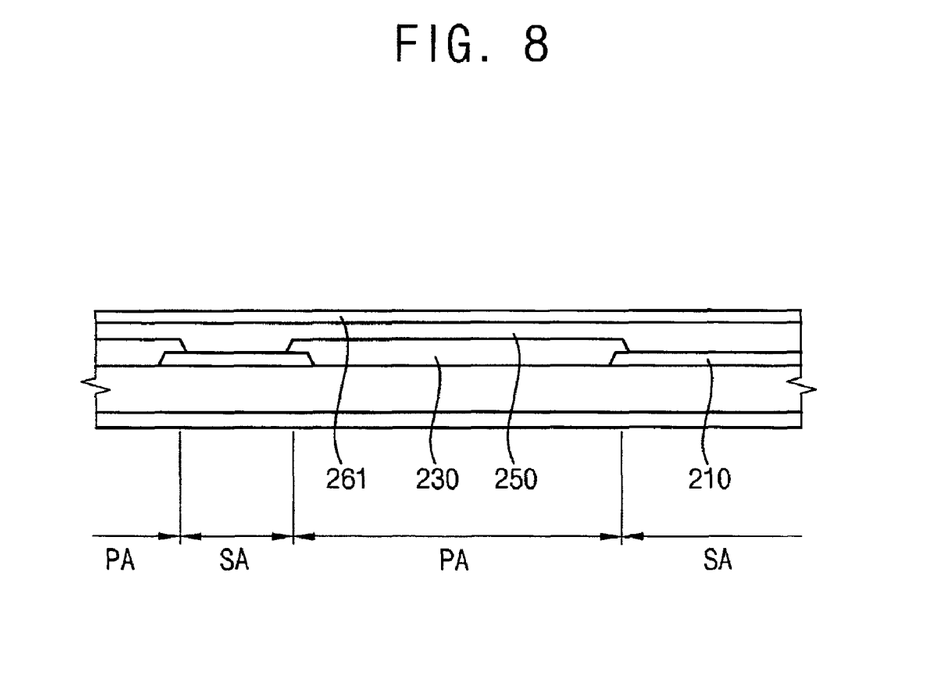
Figure 9:
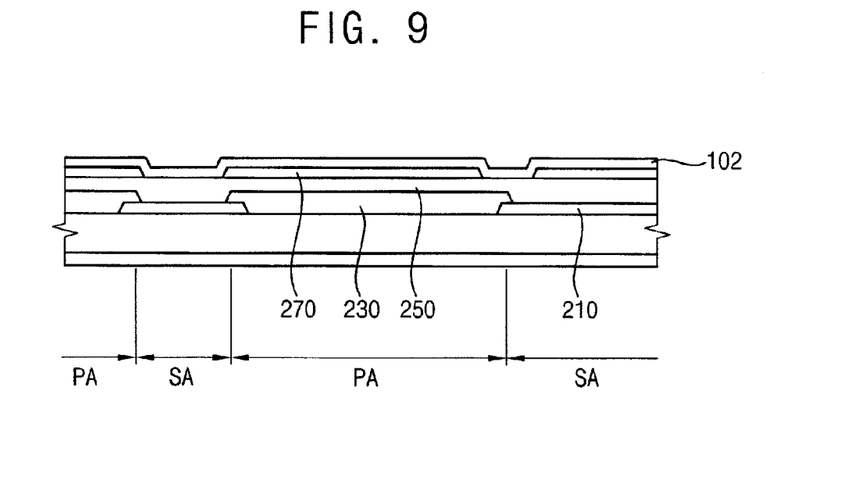

FIGS. 7 to 9 are process views illustrating a method of manufacturing the display substrate shown in FIG. 1. The display substrate shown in FIGS. 7 and 9 may be provided substantially the same as the color filter substrate shown in FIGS. 1 and 6. Thus, the same reference numerals are used for the same elements, and thus descriptions for these same elements are omitted.

To manufacture the display substrate 101, a light-blocking material layer is deposited on the base substrate 200, and is patterned on the base substrate 200. Therefore, an opaque pattern 210 is formed in the opaque region SA. A color photo resist layer is deposited at the pixel region PA defined by the opaque pattern 210. The color filter pattern 230 is formed by repeating the process of patterning. The overcoating layer 250 is formed by coating a resin which covers the light-blocking pattern 210 and the color filter pattern 230.

FIG. 8 shows forming a common electrode layer 261 by depositing a transparent conductive material as like ITO or IZO on the overcoating layer 250.

Referring to FIGS. 3 and 9, the common electrode 270 is formed by making the first slit pattern 272 which is formed by patterning the common electrode layer 261. An etching mask which has a pattern corresponding to the shape of the pairs of embossing and notches is used to make the first slit pattern 272.

Finally, the display substrate 101 is completed by forming an upper alignment layer 102 which covers the common electrode 270.

Figure 10:
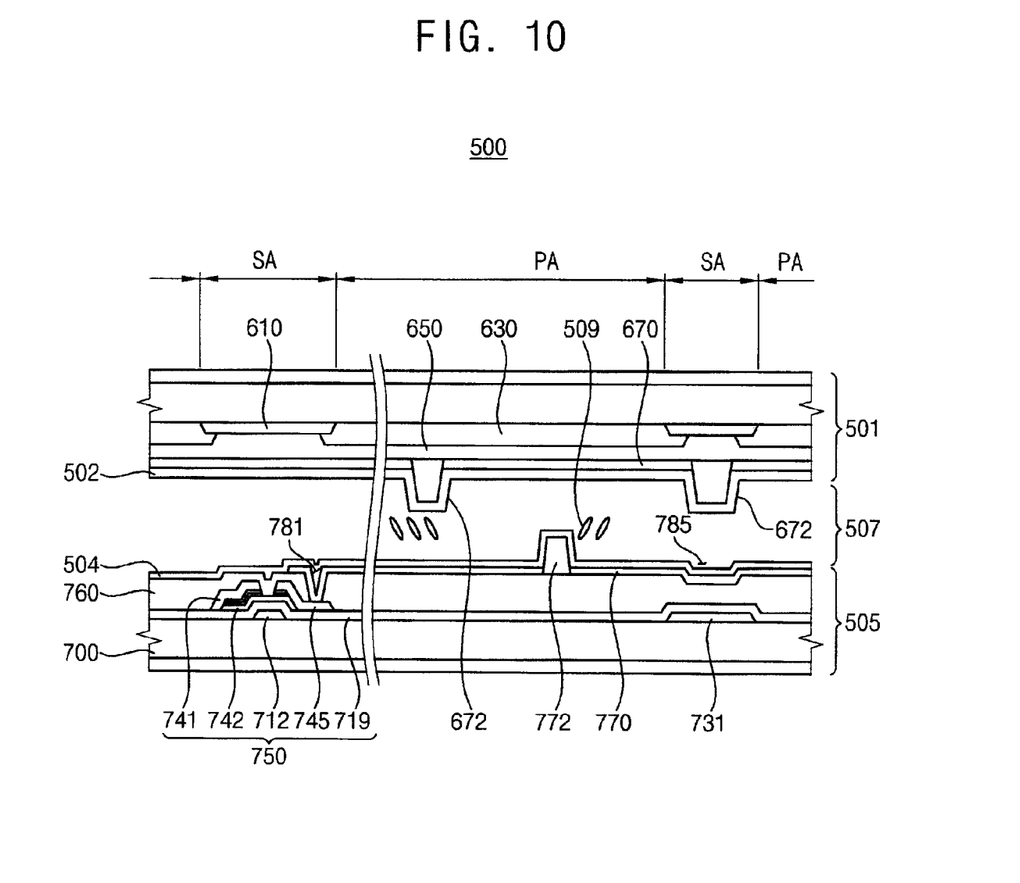
FIG. 10 is a cross-sectional view illustrating the display panel in accordance with a second embodiment of the present invention.

FIG. 10 is a cross-sectional view illustrating a display panel in accordance with an embodiment of the invention.

Referring to FIG. 10, a color filter substrate 501 may be provided substantially the same as a color filter substrate shown in FIGS. 1, 3 and 5, except that a first slit pattern is substituted for a first protrusion pattern 672 at which the pair of projections and the pair of notches are alternately formed. Thus, the same reference numerals are used for the same elements, and thus descriptions for these same elements are omitted.

A display panel 500 which includes a color filter substrate 501 described in FIGS. 7 and 8 is substantially the same as a display panel 100 described in FIGS. 1 and 6 except that a second slit pattern is substituted for a second protrusion pattern 772 in the array substrate. Thus, the same reference numerals are used for the same elements, and thus repeated descriptions will be omitted.

Referring to FIG. 10, a method of manufacturing a color filter substrate 501 may be provided substantially the same as the method of manufacturing the display substrate illustrated in FIGS. 7 to 9, except that an organic layer is formed on a common electrode after forming a common electrode layer, and a protrusions having the shape of a slit are formed by patterning the organic layer, a first protrusion pattern 672 is formed. Thus, the same reference numerals are used for the same elements, and thus descriptions for these same elements are omitted.

Figure 11:
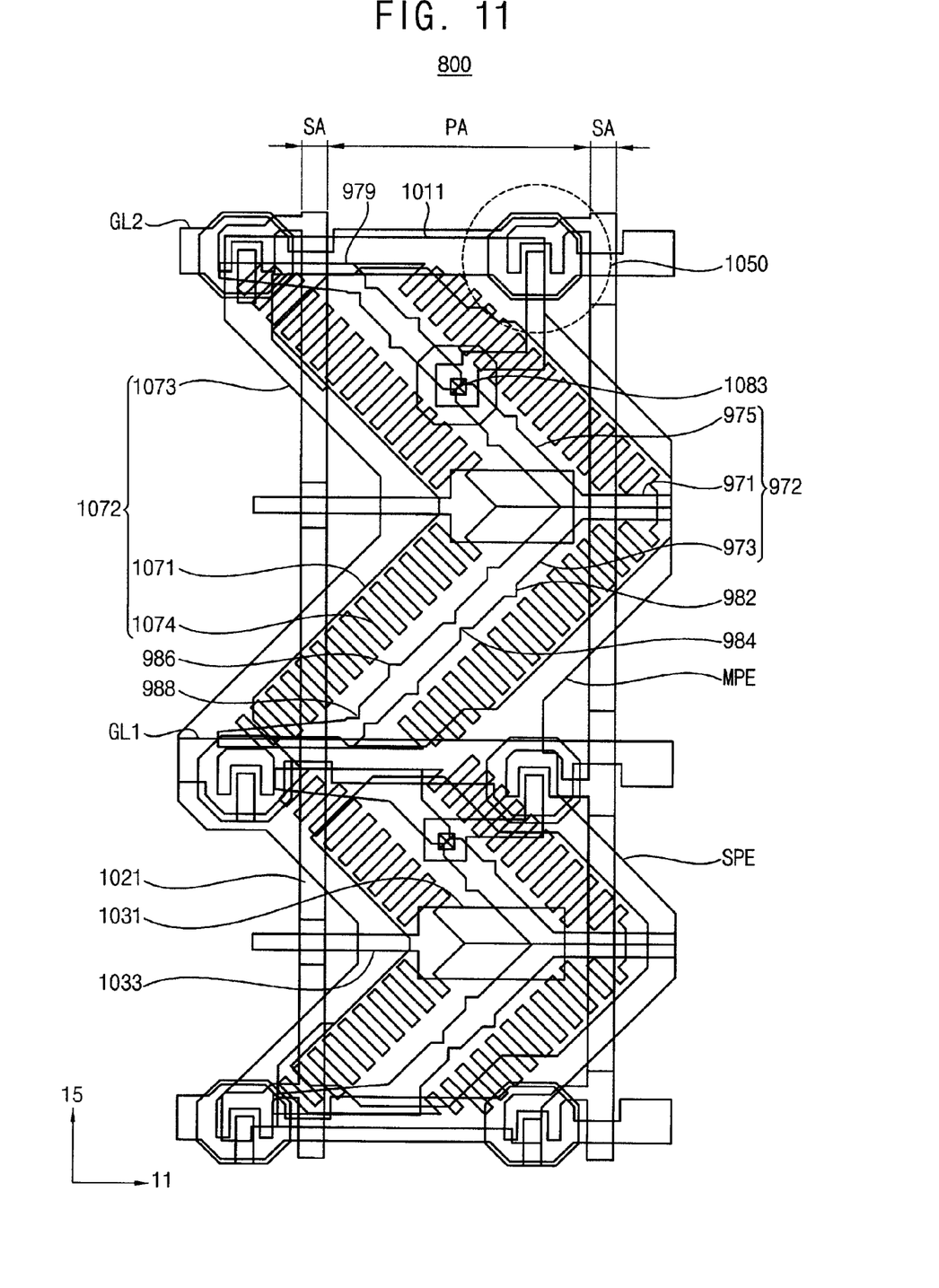
FIG. 11 is a plan view illustrating the display panel in accordance with a third embodiment of the present invention.

FIG. 11 is a plan view illustrating a display panel in accordance with an embodiment of the invention.

Referring to FIG. 11, a display panel 800 includes a color filter substrate, an array substrate and a liquid crystal layer.

Referring to FIG. 11, a color filter substrate may be provided substantially the same as a color filter substrate 101 illustrated in FIG. 1, except for the shape of a first slit pattern 972 formed on a common electrode. Therefore, a color filter substrate includes an upper substrate, an opaque pattern formed on the upper substrate, a color filter pattern, an overcoating layer 250 and a common electrode. Thus, the same reference numerals are used for the same elements, and thus descriptions for these same elements are omitted.

Two sets of the first slit patterns 972 are formed in a pixel region PA. The sizes of two sets of the first slit patterns 972 may be different, but the shape of two sets of the first slit patterns 972 is substantially the same. The first slit patterns 972 are aligned in a vertical direction 15.

Referring to FIG. 11, each first slit pattern 972 may be provided substantially the same as a first slit pattern 272 illustrated in FIGS. 1 and 3, except that a third and a fourth slanted slits 274, 276 are deleted, third and sixth peripheral slits 278a, 278b, 278c and 278d are deleted, and a left side and a right side of a first and second slanted slits 273 and 275 and a horizontal slit 271 are changed with each other.

In first and second slanted slits 973 and 975, the pair of projections and the pair of notches are alternately arranged from a divergence point at which a horizontal slit 971 and the first and second slanted slits 973 and 975 meet.

Also, a notch is formed in a corner at which the first and second slanted slits 973 and 975 and the first and second peripheral slits are connected.

Two of the first slit patterns 972 are aligned in a vertical direction 15 in a pixel region PA. Therefore, the first slanted slit 973 and the second slanted slit 975 are alternately aligned in a vertical direction 15, and thus a zigzag shape may be formed.

An array substrate includes a lower substrate, a gate line 1011 formed on the lower substrate, a data line 1021, a storage electrode 1031, a storage line 1033, a switching element 1050, a protective layer and a pixel electrode.

The array substrate may be provided substantially the same as an array substrate 105 illustrated in FIG. 1, except that a pixel region PA is generated by being divided into two regions corresponding to the two of the first slit patterns 972. Thus, the same reference numerals are used for the same elements, and thus descriptions for these same elements are omitted.

The two gate lines 1011 are involved in a pixel region PA. For example, a first gate line GL1 is extended in a horizontal direction 11 corresponding to a space between the two of the first slit patterns 972 of the color filter substrate. A second gate line GL2 is extended in a horizontal direction 11 corresponding to an edge of the pixel region PA.

Data lines 1021 are extended in a vertical direction 15.

The pixel electrode is patterned to be separated electrically in a pixel region PA. The pixel electrode is electrically separated as a main pixel electrode and a sub-pixel electrode in a vertical direction with respect to the first gate line GL1 in a pixel region PA.

The switching element 1050 electrically connects the first gate line GL1 and the sub-pixel electrode SPE. The other switching element 1050 electrically connects the second gate line GL2 and the main pixel electrode MPE. A drain electrode 1045 of the switching element 1050 is extended from an upper one of the first pair of projections of the gate electrode to a lower one of the first pair of projections, where both are within the second slanted slit 975 of the first slit pattern 972. The main pixel electrode MPE and the sub-pixel electrode SPE electrically connected each other to the drain electrode 1045 through a contact hole 1083.

A step is formed on the protective layer covering the switching element 1050 by the contact hole 1083. The step induces the negative singular point in the liquid crystal as like the pair of projections. As the contact hole 1083 is formed at a vertically lower of the pair of projections, the negative singular point is reliably formed at the pair of projections.

The storage electrode 1031 and the storage line 1033 are arranged respectively below the main pixel electrode MPE and the sub-pixel electrode SPE, and store a voltage of the main and sub-pixel during one frame. The step is formed on the protective layer at which the storage electrode 1031 is formed to increase a storage capacity, and the step induces the negative singular point in the liquid crystal. The storage electrode 1031 is arranged to correspond to a divergence point of the first slit pattern 972 in FIG. 11. The divergence point induces the negative singular point in the liquid crystal at the pair of projections. Because the storage electrode 1031 is formed at a vertical lower of the divergence point, the negative singular point is reliably formed at the pair of projections.

The switching elements 1050 which are respectively connected to the main pixel electrode MPE and the sub-pixel electrode SPE may be connected to the same data line 1021. The different pixel voltages are applied to the main pixel electrode MPE and the sub-pixel electrode SPE through the data line 1021 by a time division method during a horizontal scanning period at which the pixel voltages are applied to the pixel electrode of a first line aligned in a horizontal direction 11.

The second slit pattern 1072 is respectively formed in the main pixel electrode MPE and the sub-pixel electrode SPE corresponding to the first slit pattern 972. The second slit pattern includes a fifth slanted slit 1071, a sixth slanted slit 1073 and uneven pattern slits 1074.

The fifth slanted slits 1071 is formed in parallel with the first slanted slit 973, and the first slanted slit 973 is arranged to correspond to a space between the two of the fifth slanted slit 1071. The sixth slanted slits 1073 is formed in parallel with the second slanted slit 975, and the second slanted slit 973 is arranged to correspond to a space between the two of the sixth slanted slit 1073. The fifth and sixth slanted slits 1071 and 1073 are connected each other, and approximately form a V-shape. Therefore, the first slanted slit 973 and the second slanted slit 975 are alternately aligned in a zigzag shape to a vertical direction 15 from the main pixel electrode MPE and the sub-pixel electrode SPE.

A plurality of uneven pattern slits 1074 are formed in regular pitch toward the first and second slanted slits 973 and 975 from the edge of the fifth and sixth slanted slits 1071 and 1073.

Therefore, the pixel region PA is divides into a plurality of domains by the first slit pattern 972 formed on the common electrode and the second slit pattern 1072 which is formed respectively on the main pixel electrode MPE and the sub-pixel electrode SPE. Therefore, the alignment direction of the liquid crystal is different in each domain, and thus the display panel 800 may have excellent display quality at various viewing angles.

Referring to FIG. 11, a method of manufacturing a color filter substrate may be provided substantially the same as the method of manufacturing a color filter substrate illustrated in FIGS. 7 to 9, except for a different shape of the first slit pattern 972. Thus, repeated descriptions will be omitted.

According to embodiments of the present invention, a display substrate and a display panel are always applied in a case where an electrode controlling liquid crystal is patterned, and the liquid crystal is aligned in a vertical direction.

Thus, the present invention can be applied so as to enhance the display quality of the LCD device.

As described above, embodiments of the present invention include a display substrate and/or a display panel with advantageous features. Properly applied, these features can reduce or prevent the generation of afterimages by controlling the position where a singular point is generated within the liquid crystal. Thus display quality can be enhanced.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A display substrate, comprising:
a base substrate, on which a pixel region having a horizontal direction and a vertical direction is defined; and
a transparent electrode on the base substrate, wherein the transparent electrode includes a slit pattern having slits in the pixel region, a pair of projections, and a pair of notches, the pair of the projections and the pair of the notches being alternately arranged along the slits, the notches being substantially adjacent to a divergence point where adjacent slits meet each other, and the pair of the projections being substantially adjacent to an edge of the pixel region.

2. The display substrate of claim 1, the slit pattern comprising:
a horizontal slit extended horizontally from the divergence point;
a right slanted slit extending from the divergence point in a slanted direction toward a right vertical side, the right slanted slit having an incision portion;
a right peripheral slit substantially parallel with the right slanted slit, and connecting to the incision portion of the first slanted slit; and
a left slanted slit and a left peripheral slit having horizontal mirror symmetry with the right slanted slit and the right peripheral slit.

3. The display substrate of claim 2, wherein the right slanted slit has a right pair of notches substantially adjacent to the divergence point, a right pair of projections substantially adjacent to the right pair of the notches, a left pair of notches substantially adjacent to the left pair of the projections and a left pair of projections substantially adjacent to the left pair of the notches.

4. The display substrate of claim 3, wherein a further notch is positioned at a corner at which an outside edge of the right peripheral slit and the right slanted slit meet at an obtuse angle.

5. The display substrate of claim 3, further comprising:
a color filter pattern between the base substrate and the transparent electrode, wherein the color filter pattern is patterned to correspond to the pixel region;
a opaque pattern on the base substrate, wherein the opaque pattern is patterned to enclose the color filter pattern; and
an overcoating layer between the transparent electrode and the color filter pattern.

6. A display panel comprising:
a first substrate including a common electrode and an upper substrate on which a pixel region is defined, wherein the pixel region has a horizontal direction and a vertical direction, and wherein the common electrode has a first slit pattern having slits in the pixel region, a pair of projections, and a pair of notches, the pair of the projections and the pair of the notches being alternately arranged along the slits, the notches being substantially adjacent to a divergence point where adjacent slits meet each other, and the pair of the projections being substantially adjacent to an edge of one of the slits that is on the vertical side;
a second substrate including a lower substrate, a switching element on the lower substrate, a protective layer having a contact hole exposing a portion of an output electrode of the switching element and corresponding to the pair of projections, and a pixel electrode at which there is a second slit pattern arranged in a staggered pattern with the first slit pattern, wherein the pixel electrode is on the protective layer and is connected to the output electrode through the contact hole; and
a liquid crystal layer between the first substrate and the second substrate.

7. The display panel of claim 6, wherein the first slit pattern comprises:
a horizontal slit extending horizontally from the divergence point;
a right slanted slit extending in a slanted direction toward a right vertical side from the divergence point, wherein the right slanted slit has a first pair of projections corresponding to the contact hole and has an incision portion;
a right peripheral slit extending along the right vertical side and connecting to the incision portion of the right slanted slit; and
a left slanted slit and a left peripheral slit having horizontal mirror symmetry with the right slanted slit and the right peripheral slit.

8. The display panel of claim 7, wherein the right slanted slit comprises:
a first pair of notches arranged between the first pair of projections and the divergence point;

a second pair of notches arranged between the first pair of projections and the incision portion of the right slanted slit; and a second pair of projections arranged between the second pair of notches and the incision portion of the right slanted slit.

9. The display panel of claim 8, wherein a further notch is positioned at a corner at which an outside edge of the right peripheral slit and an outside edge of the right slanted slit meet at an obtuse angle.

10. The display panel of claim 8, wherein a distance from a corner at which an outside edge of the right peripheral slit and an outside edge of the right slanted slit meet at an obtuse angle to the second pair of projections is below 15 μm and a notch is not formed at the corner.

11. The display panel of claim 8, wherein the second substrate is between the lower substrate and the protective layer, and the second substrate further includes a storage electrode corresponding to the divergence point.

12. The display panel of claim 11, wherein the protective layer further has a step recess corresponding to the storage electrode.

13. The display panel of claim 12, wherein the protective layer comprises:

a passivation layer covering the switching element; and an organic insulating layer formed on the passivation layer.

14. The display panel of claim 11, wherein the first substrate comprises:

a color filter pattern between the upper substrate and the common electrode, wherein the color filter pattern is patterned to correspond to the pixel region;

an opaque pattern on the upper substrate, wherein the opaque pattern is patterned to enclose the color filter pattern; and an overcoating layer between the common electrode and the color filter pattern.

15. The display panel of claim 11, wherein the second substrate comprises:

a gate line on the lower substrate, wherein the gate line runs in the horizontal direction and is connected to a control electrode of the switching element; and a data line on the lower substrate, wherein the data line runs in the vertical direction, is connected to a source electrode of the switching element, and is overlapped with the first peripheral slit and the second peripheral slit.

16. The display panel of claim 15, wherein the second slit pattern comprises:

a third slanted slit substantially parallel with the first slanted slit;

a fourth slanted slit substantially parallel with the second slanted slit; and an horizontal slit cut to a left vertical side from a right vertical side of the pixel electrode.

17. The display panel of claim 16, wherein pairs of projections and pairs of notches are respectively positioned at the third and fourth slanted slits, and the pairs of the projections and the pairs of the notches are patterned substantially the same as the first and second pairs of the projections positioned at the first and second slanted slits.

18. A display panel comprising:

a first substrate including:

an upper substrate having a pixel region having a horizontal direction and a vertical direction;

a plurality of protrusions formed on the upper substrate in the pixel regions; and a common electrode including a first protrusion pattern having a pair of projections and a pair of notches on the protrusions, wherein the pair of the projections and the pair of the notches are alternately arranged along the protrusions, the notches are substantially adjacent to a divergence point where adjacent protrusions meet each other, and the pair of the projections are substantially adjacent to an incision portion of the protrusion arranged in the vertical side;

a second substrate including a lower substrate, a switching element formed on the lower substrate, a protective layer having a contact hole exposing a portion of an output electrode of the switching element and corresponding to the pair of the projections, and a pixel electrode at which a second protrusion pattern arranged in a staggered pattern with the first protrusion pattern is formed, wherein the pixel electrode is formed on the protective layer and is connected to the output electrode through the contact hole; and a liquid crystal layer between the first substrate and the second substrate.

19. The display panel of claim 18, wherein the first protrusion pattern comprises:

a horizontal protrusion portion extending substantially horizontally from the divergence point;

a first slanted protrusion portion extending in a slanted direction toward a right vertical side from the divergence point and having a first pair of projections corresponding to the contact hole;

a first peripheral protrusion portion extending along the right horizontal side and connecting to the incision portion of the first slanted protrusion portion; and a second slanted protrusion portion and a second peripheral protrusion portion having horizontal mirror symmetry with the first slanted protrusion portion and the first peripheral protrusion portion.

20. The display panel of claim 19, wherein the first slanted protrusion portion comprises:

a first pair of notches between the first pair of the projections and the divergence point;

a second pair of notches between the first pair of the projections and the incision portion of the first slanted protrusion portion;

a second pair of projections between the second pair of the notch and the incision portion of the first slanted protrusion portion; and a notch at a corner at which the first slanted protrusion portion and the first peripheral protrusion portion meet.

* * * * *